United States Patent [19]

Naka

[11] Patent Number: 4,796,278
[45] Date of Patent: Jan. 3, 1989

[54] REPEATER FOR DIGITAL COMMUNICATION SYSTEM

[75] Inventor: Yoshihiro Naka, Tokyo, Japan

[73] Assignee: NEC Corporation, Japan

[21] Appl. No.: 173,870

[22] Filed: Mar. 28, 1988

[30] Foreign Application Priority Data

Mar. 27, 1987 [JP] Japan .................................. 62-75400

[51] Int. Cl.4 ............................................. H04B 7/15
[52] U.S. Cl. ......................................... 375/3; 375/108
[58] Field of Search ..................... 375/3, 3.1, 4, 106, 375/108; 371/61; 455/8, 9; 178/70 R

[56] References Cited

U.S. PATENT DOCUMENTS 3,987,395 10/1976 Desombre et al. ..................... 375/4
4,466,110 8/1984 Kizaki et al. ......................... 375/108
4,561,101 12/1985 Pinsard et al. ....................... 375/108
4,660,201 4/1987 Nakamura ............................. 371/61

Primary Examiner—Benedict V. Safourek
Attorney, Agent, or Firm—Ostrolenk, Faber, Gerb & Soffen

[57] ABSTRACT

A repeater includes a receiver, a synchronizing signal generator, a step out detector, a first selector for selecting either a receiver output or a synchronizing signal generator output in accordance with a first control signal, a second selector for selecting one of the receiver output or the synchronizing signal generator output and supplying it to the step out detector, and a controller for outputting first and second control signals for controlling the first selector to select the synchronizing signal generator output when step out is detected in the receiver output and controlling the first and second selectors to select the receiver output when step out is detected in the synchronizing signal generator.

4 Claims, 5 Drawing Sheets

REPEATER FOR DIGITAL COMMUNICATION SYSTEM

BACKGROUND OF THE INVENTION

The present invention relates to a repeater for a digital communication system and, more particularly, to a repeater having a channel monitoring system which can determine a fault position on a PCM communication channel.

FIGS. 1, 2, and 3 show three typical conventional channel monitoring systems of digital communication repeaters, respectively. In FIGS. 1, 2, and 3, connections other than that concerning channel monitoring are omitted.

In the repeater of the type shown in FIG. 1, a reception signal 1 is supplied from a receiver 3 to only a transmitter 4. Therefore, a monitoring unit 5 can detect interruption of the reception or transmission signal but cannot detect a synchronizing signal in the reception signal. Since a step out fault caused by a degradation in channel quality can be detected only at a terminal, a repeating section in which the channel fault occurs cannot be determined.

In the repeater of the type shown in FIG. 2, a synchronizing signal detector 6 is inserted between the receiver 3 and the monitoring unit 5. Therefore, when the channel quality of the reception signal is degraded and step out occurs, the monitoring unit 5 detects this step out. In this case, fault information can be generated in a repeating section in which the channel fault has occurred. However, since a signal including the fault is directly reproduced and transmitted, a repeating section in which the fault has occurred cannot be determined. In addition, it cannot be determined whether the fault has occurred in the synchronizing signal detector 6 or in the reception signal 1.

In the repeater of the type shown in FIG. 3, a synchronizing signal generator 7 and a signal selector 8 are added to the repeater shown in FIG. 2. When the synchronizing signal detector 6 detects a channel fault in the reception signal 1, it supplies fault information to the monitoring unit 5 and the signal selector 8. The signal selector 8 selects a signal of the synchronizing signal generator 7 in the self repeater in place of the reception signal 1 and supplies it to the transmitter 4. For this reason, even if a fault occurs in the reception signal 1, a synchronizing signal is always included in the transmission signal 2. Therefore, no channel fault information is generated after the next repeater. However, it cannot be determined whether the fault has occurred in the synchronizing signal detector 6 or in the reception signal 1.

SUMMARY OF THE INVENTION

It is, therefore, an object of the present invention to eliminate the above conventional drawbacks and provide a repeater which can determine a fault position with high reliability when the fault occurs in a reception signal.

A repeater for a digital communication system, comprises a receiver for receiving an input signal from a transmission line, a transmitter for outputting an output signal of the repeater, synchronizing signal generating means for generating a synchronizing signal corresponding to the output signal from the receiver, first signal selecting means for selecting one of the output signal from the receiver and the output signal from the synchronizing signal generating means and outputting the selected signal to the transmitter in response to a first control signal, second signal selecting means for selecting one of the output signal from the receiver and the output signal from the synchronizing signal generating means in response to a second control signal, step out detecting means for detecting step out in the output signal of the receiver or in the output signal from the synchronizing signal generating means, which is received through the second signal selecting means, and control means for supplying first and second control signals to the first and second signal selecting means in response to an output signal from the step out detecting means.

DETAILED DESCRIPTION OF THE PREFERRED EMBODIMENTS

Embodiments of the present invention will be described below with reference to the accompanying drawings.

Figure 1:
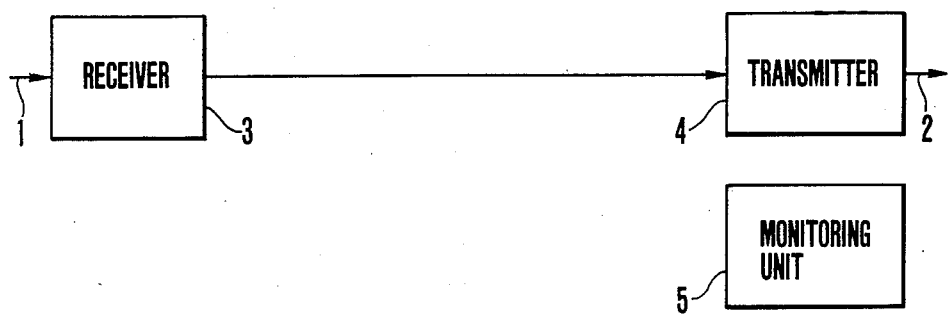
FIGS. 1, 2, and 3 are block diagrams of conventional techniques.
Figure 2:
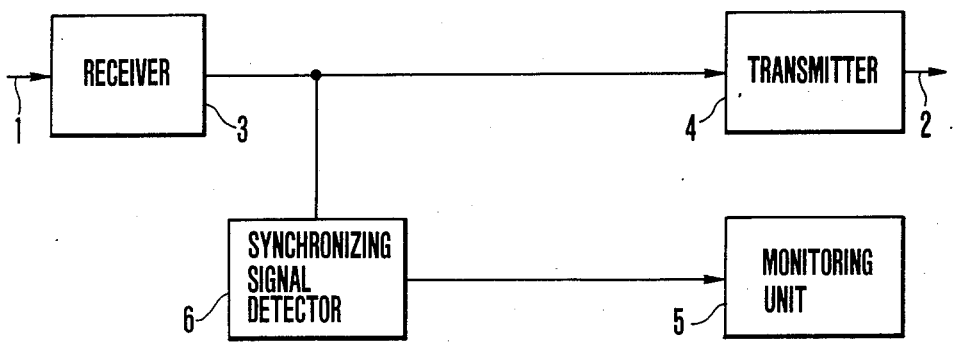
Figure 3:
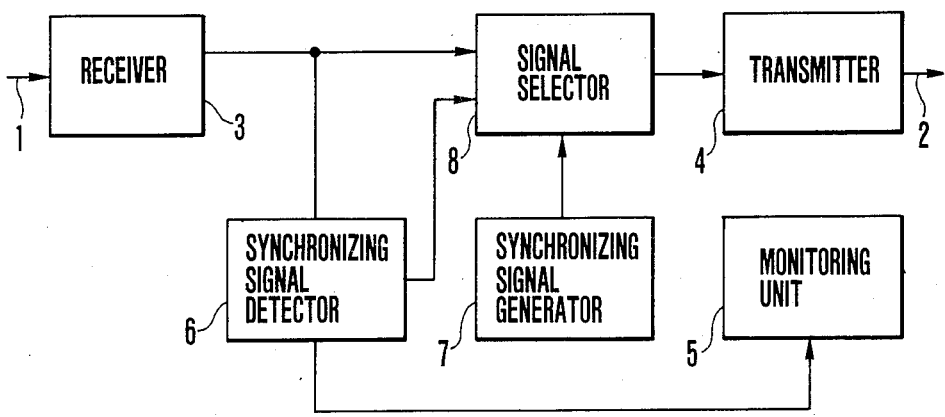
Figure 4:
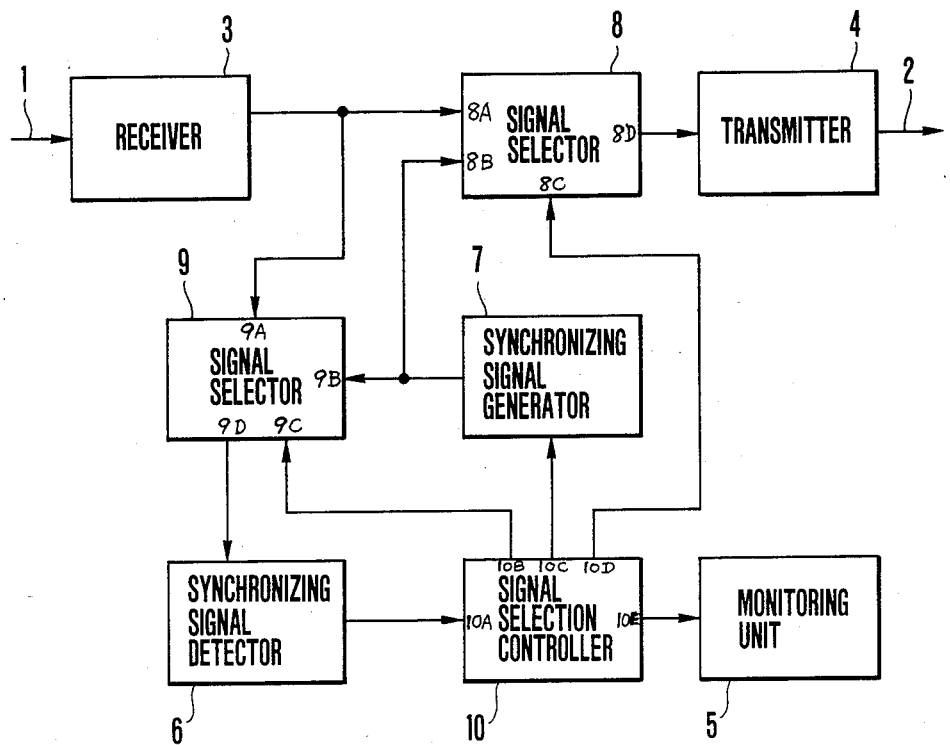
FIG. 4 is a block diagram of an embodiment of the present invention.

FIG. 4 is a block diagram of an embodiment of a repeater for a digital communication system according to the present invention.

In FIG. 4, a receiver 3 receives a reception signal 1, performs predetermined processing of the signal, and then supplies it to input terminals 8A and 9A of signal selectors 8 and 9, respectively. A synchronizing signal generator 7 generates and supplies a synchronizing signal to input terminals 8B and 9B of the signal selectors 8 and 9, respectively. The signal selector 8 selects one of the signals input to the input terminals 8A and 8B in response to a control signal supplied to a control terminal 8C, and outputs the selected signal from an output terminal 8D to a receiver 4. The signal selector 9 time-divisionally selects one of the signals input to the input terminals 9A and 9B in response to a control signal supplied to a control terminal 9C, and outputs the selected signal from an output terminal 9D to a synchronizing signal detector 6. The synchronizing signal detector 6 receives the output from the signal selector 9, detects step out therein, and then outputs a detection signal to an input terminal 10A of a signal selection controller 10. The signal selection controller 10 supplies a control signal to the signal selector 9 to control time-divisional selection of the output from the receiver 3 and the output from the synchronizing signal generator 7. The controller 10 also supplies a control signal to the synchronizing signal generator 7 to control generation of the synchronizing signal. When the signal selection controller 10 receives the detection information representing step out in the output from the receiver 3 in accordance with the output signal from the synchronizing signal detector 6, it causes the signal selector 8 to select the output signal from the synchronizing signal generator 7. When the signal selection controller 10 receives detection information representing step out in the output from the synchronizing signal generator 7, it supplies control signals to the signal selectors 8 and 9 so that they select the output signals from the receiver 3 and also supplies fault information to a monitoring unit 5.

An operation of the system shown in FIG. 4 will be described below.

The signal selection controller 10 controls the signal selector 9 so that the signal from the synchronizing signal generator 7 is supplied to the synchronizing signal detector 6. When the synchronizing signal detector 6 cannot detect a synchronizing signal in the above signal within a predetermined time, it supplies fault information representing step out to the signal selection controller 10. At this time, the signal selection controller 10 informs the monitoring unit 5 that a fault has occurred in the synchronizing signal generator 7.

When the synchronizing signal detector 6 does not generate the fault information representing step out, the signal selection controller 10 controls the signal selector 9 so that the synchronizing signal detector 6 receives the reception signal 1. When the synchronizing signal detector 6 cannot detect a synchronizing signal within the predetermined time, it supplies fault information representing step out to the signal selection controller 10. The signal selection controller 10 supplies channel fault information to the monitoring unit 5 and controls the signal selector 8 to select the synchronizing signal generated from the synchronizing signal generator 7 in place of the reception signal 1 as a signal to be supplied to the transmitter 4.

When a fault occurs in the synchronizing signal generator 7 itself, this fault information is supplied to the monitoring unit 5 via the signal selection controller 10. The signal selection controller 10 controls the signal selectors 8 and 9 to select only the reception signal 1, and reproduces and transmits the reception signal 1 as a transmission signal 2. Therefore, the signal selection controller 10 supplies only a state of the reception signal 1 detected by the synchronizing signal detector 6 as channel information to the monitoring unit 5.

According to this embodiment, even if a fault occurs in the reception signal 1, a synchronizing signal is always included in the transmission signal 2, and therefore no channel fault occurs after the next repeater. In addition, a fault of the synchronizing signal detector 6 can be determined.

In this embodiment, synchronizing signals in the reception signal 1 and in the system itself are time-divisionally monitored. However, other channels can be easily, time-divisionally monitored and controlled.

Figure 5:
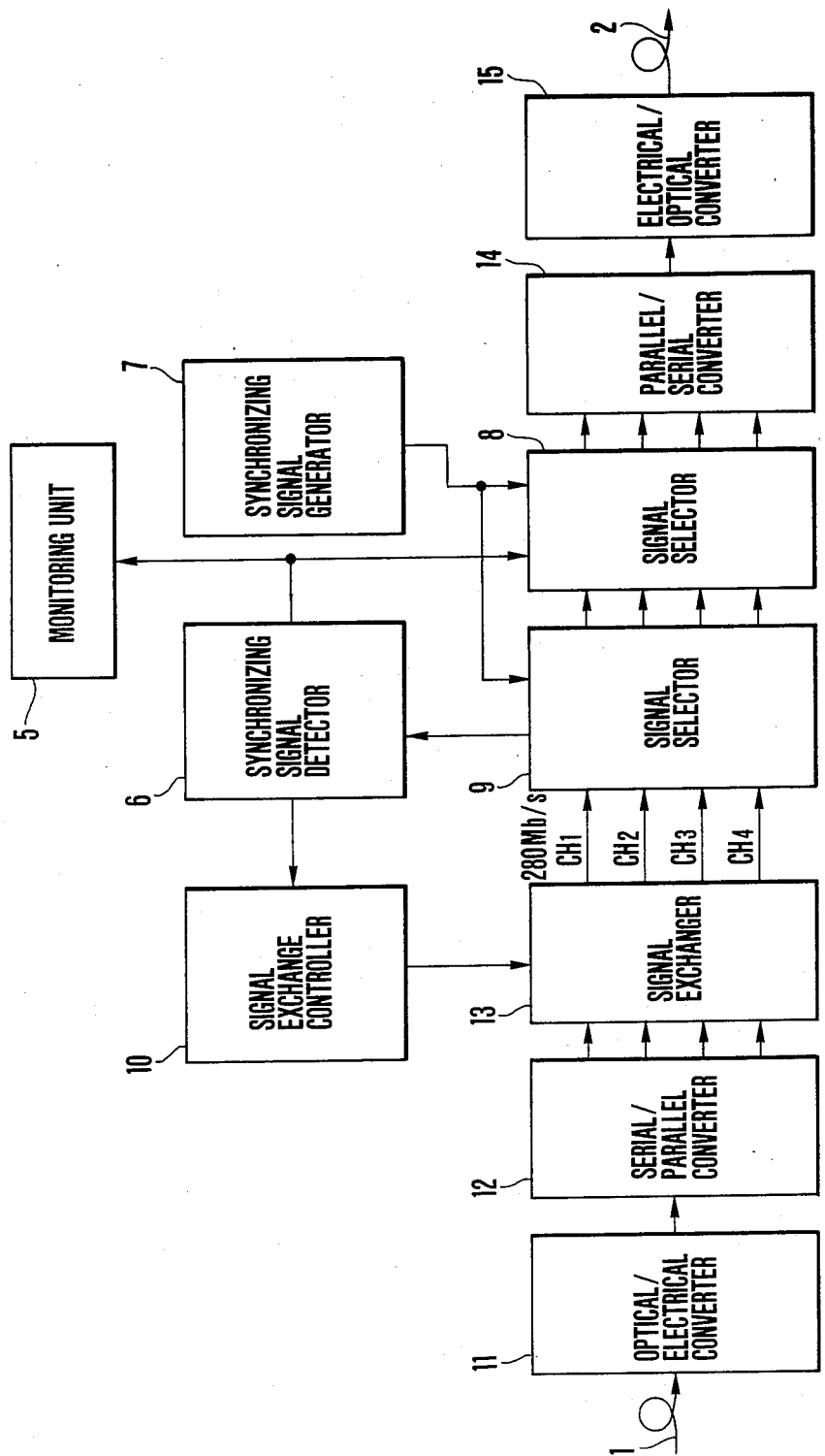
FIG. 5 is a block diagram of another embodiment of the present invention.

FIG. 5 is a block diagram of another embodiment of the repeater according to the present invention.

In FIG. 5, the same reference numerals as in FIG. 4 denote the same components, and a detailed description thereof will be omitted.

Figure 6:
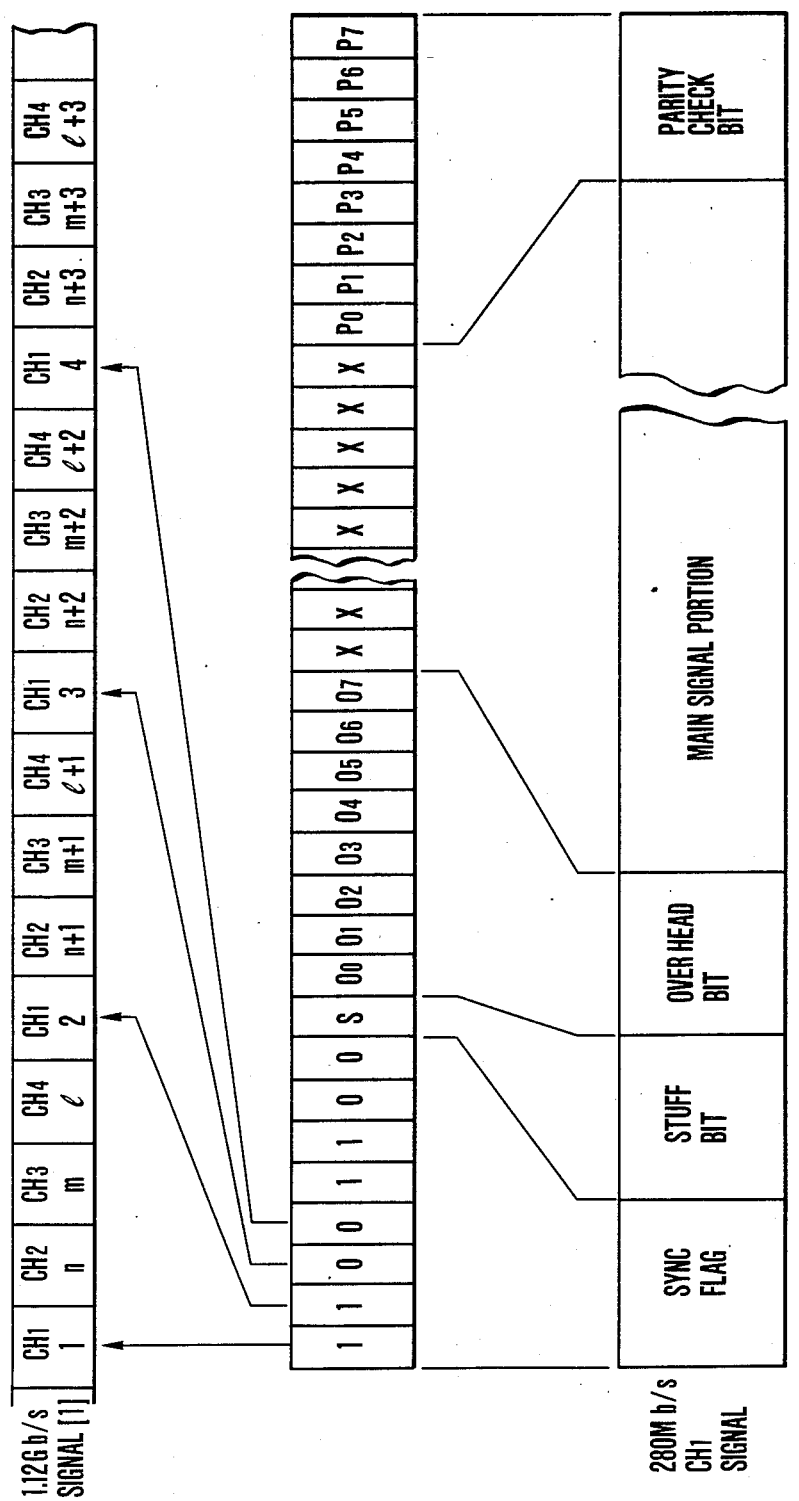
FIG. 6 is a schematic view for explaining a frame format of an input signal in FIG. 5.

The repeater shown in FIG. 5 reproduces and repeats a 1.12-Gb/s optical signal 1 obtained by multiplexing four 280-Mb/s signals bit by bit as shown in FIG. 6. One of channels CH1~CH4 of 280-Mb/s signals is multiplexed by every 4 bits. This repeater monitors a state of the signal in units of 280-Mb/s channels and supplies an AIS signal (in which main signal components are all "1"s in FIG. 6) when step out is detected.

In the frame format shown in FIG. 6, a sync flag repeats a predetermined pattern such as "11001100" or "00110011" to indicate a head of data frame. A SYNC function determines positions of overhead bits and the like on the basis of the sync flag and extracts various overhead bits.

Stuff bit S is inserted in the data frame to cancel an offset of clocks when the 280-Mb/s signal is converted into an optical signal at a terminal. Therefore, the stuff bit is destuffed before parity check in the repeater.

Service data, alarm information, channel selection control information, parity information, and the 20 like are set in overhead bits $O_0 \sim O_7$.

The channel selection control information is used to determine channels of the 280-Mb/s signals separated from the 1.12-Gb/s signal.

A main signal received is set in a main signal portion. In this repeater, a signal obtained by multiplying DS3 signals, i.e., the third group of a North America digital signal of 6 channels is used.

When data is stuff-multiplexed at a terminal, a parity is set in parity check bits $P_0 \sim P_7$ of the data frame. Each repeater or terminal which receives this data calculates a parity of the reception data and compares it with parity bits in the reception data frame, thereby measuring an error rate or displaying an alarm.

In FIG. 5, the 1.12-Gb/s optical signal 1 is converted into an electrical signal by an optical/electrical converter 11. A 1.12-Gb/s electrical signal is separated into four 280-Mb/s channels CH1, CH2, CH3, and CH4 by a serial/parallel converter 12 and output to a signal exchanger 13. The signal exchanger 13 supplies each signal of the channels CH1, CH2, CH3, and CH4 to a corresponding signal line.

A signal selector 9 time-divisionally, selectively supplies the four 280-Mb/s signals and a signal from a synchronizing signal generator 7 to a synchronizing signal detector 6.

The synchronizing signal detector 6 detects a synchronizing signal component in the 280-Mb/s signal supplied from the signal selector 9, checks whether the signal is normal, and outputs a fault detection signal. At this time, the synchronizing signal detector 6 extracts the overhead bits including selection control information which is supplied to the signal exchanger 13 to supply the channels CH1~CH4 to a corresponding signal line and monitor control information from a signal in which the synchronizing signal is detected.

A signal exchange controller 10 controls the signal exchanger 13 on the basis of a channel number included in the overhead bits extracted by the synchronizing signal detector 6 so that each 280-Mb/s signal is supplied to a corresponding signal line.

The synchronizing signal generator 7 generates a synchronizing signal (AIS signal) having a 280-Mb/s sync flag, in which information of all "1"s is inserted in the main signal portion shown in FIG. 6.

A signal selector 8 selects the reception signal 1 or the synchronizing signal generated from the synchronizing signal generator 7 on the basis of an output from the synchronizing signal detector 6.

A parallel/serial converter 14 synchronously multiplexes the four 280-Mb/s signals from the signal selector 8 bit by bit to obtain a 1.12-Gb/s signal.

An electrical/optical converter 15 converts the output electrical signal from the parallel/serial converter 14 into an optical signal.

A monitoring unit 5 performs alarm display in accordance with an output from the synchronizing signal detector 6. In this repeater, the monitoring unit 6 monitors an optical input, an error generation state of a signal, an optical output, and the like.

Figure 7:
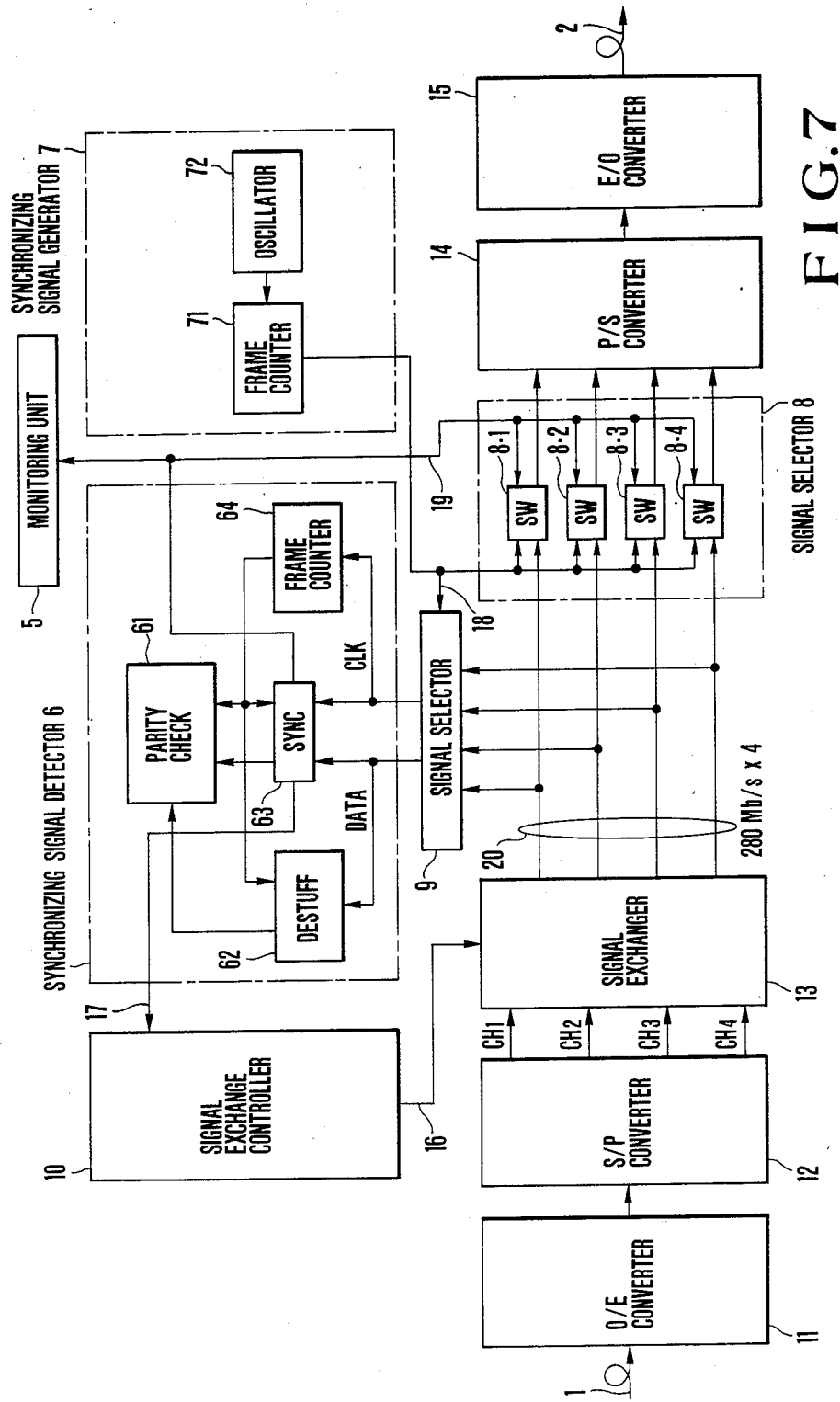
FIG. 7 is a block diagram of an embodiment of part of the embodiment in FIG. 5.

FIG. 7 is a block diagram showing in detail embodiments of the synchronizing signal detector 6, the synchronizing signal generator 7, and the signal selectors 8 and 9 of the repeater shown in FIG. 6.

In FIG. 7, a signal selector 9 periodically selects four 280-Mb/s signals or a synchronizing signal supplied from a synchronizing signal generator 7, and outputs the signal to a synchronizing signal detector 6.

The synchronizing signal detector 6 performs the following operations of the 280-Mb/s reception signals supplied from the signal selector 9.

(1) Detection of a sync flag by a SYNC circuit 63.

(2) Counting of bits of a data frame using reception clocks extracted from each 280-Mb/s signal line by a frame counter 64 and informing of a data frame length and positions of stuff and overhead bits to the SYNC circuit 63.

(3) Removal of stuff bits in the data frame of the 280-Mb/s signal by a dyestuff circuit 62 because the signal is stuff-synchronized.

(4) Extraction of parity bits and a channel selection control bit indicating the channel mumber of 280-Mb/s signal by the SYNC circuit 63 in accordance with an output from the frame counter 64 after synchronism is established and supplying of the bits to a signal exchange controller 10 and a parity check circuit 61.

(5) Informing of a reception fault to the monitoring unit 5 when no sync flag is detected.

(6) Supplying of step out information to a signal selector 8 so as to select the AIS signal or the reception signal as a signal to be transmitted in units of 280-Mb/s channels.

The signal selector 8 receives an output signal from the synchronizing signal detector 6 and selects the reception signal supplied from the signal exchanger 13 or the synchronizing signal supplied from the synchronizing signal detector 6 in units of 280-Mb/s channels.

The synchronizing signal generator 7 has an oscillator 72 and forms a data frame of 280 Mb/s using clocks generated by the oscillator 72.

Only a sync flag for obtaining frame synchronism and overhead bits for representing a channel number and transferring alarm information are set in this data frame shown in FIG. 6 and all "1"s are set in its main signal portion.

A signal in which a main signal is all "1"s is called an AIS signal for activating fault detection and protection operations at a terminal which receives this signal.

As has been described above, according to the present invention, the signal selector 9 time-divisionally supplies the synchronizing signal from the synchronizing signal generator 7 and the output from the signal exchanger 13 to the synchronizing signal detector 6, thereby the detector 6 detecting a fault. When the synchronizing signal detector 6 detects step out in the reception signal, the signal selector 8 which normally selects and supplies the output from the signal exchanger 13 to the P/S converter 14 selects the synchronizing signal from the synchronizing signal generator 7 by the step out information from the SYNC circuit 63. When the synchronizing signal detector 6 detects step out in the synchronizing signal from the synchronizing signal generator 7, the signal selector 8 selects and supplies the output from the receiver 3 until a fault is no longer detected. With this operation, a synchronizing signal with high reliability can be supplied when a fault occurs in the reception signal. Therefore, the repeater at a rear-stage can be stably operated and a fault position can be determined with high reliability.

What is claimed is:

1. A repeater for a digital communication system, comprising:
    a receiver for receiving an input signal from a transmission line;
    a transmitter for outputting an output signal of said repeater;
    synchronizing signal generating means for generating a synchronizing signal corresponding to the output signal from said receiver;
    first signal selecting means for selecting one of the output signal from said receiver and the output signal from said synchronizing signal generating means and outputting the selected signal to said transmitter in response to a first control signal;
    second signal selecting means for selecting one of the output signal from said receiver and the output signal from said synchronizing signal generating means in response to a second control signal;
    step out detecting means for detecting step out in the output signal of said receiver or in the output signal from said synchronizing signal generating means, which is received through said second signal selecting means; and
    control means for supplying first and second control signals to said first and second signal selecting means in response to an output signal from said step out detecting means.

2. A repeater according to claim 1, wherein when said step out detecting means detects step out while said second signal selecting means selects the output from said synchronizing signal generating means, the first control signal controls said first signal selecting means to select the output from said receiver.

3. A repeater according to claim 1, wherein after said step out detecting means detects step out in the output from said synchronizing signal generating means, the second control signal controls said second signal selecting means to select the output from said receiver.

4. A repeater according to claim 3, wherein when no step out is detected in the output from said synchronizing signal generating means, the second control signal time-divisionally selects the output signal from said receiver or the output signal from said synchronizing signal generating means.

* * * * *